United States Patent [19]

Parkison et al.

[11] 4,421,294
[45] Dec. 20, 1983

[54] VALVE DIAPHRAGM

[75] Inventors: Richard G. Parkison; Edward G. Hofstetter, both of Louisville, Ky.

[73] Assignee: American Standard, Inc., New York, N.Y.

[21] Appl. No.: 292,527

[22] Filed: Aug. 13, 1981

[51] Int. Cl.³ .......................... F16K 7/16; F16K 25/00
[52] U.S. Cl. ....................................... 251/86; 251/331; 251/335 B
[58] Field of Search ................... 251/85, 86, 265, 273, 251/330, 331, 334, 335 A, 335 B

[56] References Cited

U.S. PATENT DOCUMENTS

| 372,641 | 11/1887 | Robertshaw | 251/86 |
| 529,692 | 11/1894 | Bavier | 251/86 |
| 584,291 | 6/1897 | Osgood | 251/86 |
| 649,132 | 5/1900 | MacCorquodale | 251/86 |
| 3,552,714 | 1/1971 | Mannville | 251/88 |
| 4,203,464 | 5/1980 | Farrell et al. | 137/454.2 |

FOREIGN PATENT DOCUMENTS

| 2231382 | 1/1974 | Fed. Rep. of Germany . |
| 2644719 | 5/1977 | Fed. Rep. of Germany . |
| 2820169 | 11/1978 | Fed. Rep. of Germany . |
| 2821167 | 11/1979 | Fed. Rep. of Germany . |
| 1296471 | 12/1962 | France | 251/331 |
| 1198075 | 7/1970 | United Kingdom | 251/331 |
| 395653 | 8/1973 | U.S.S.R. | 251/335 B |

Primary Examiner—George L. Walton
Attorney, Agent, or Firm—Robert C. Crooks; Daniel J. Reardon

[57] ABSTRACT

In a valve apparatus for controlling fluid flow wherein the apparatus comprises a valve assembly and valve housing; the valve housing including a valve chamber incorporating fluid inlet and outlet conduits and a valve seat; and the valve assembly including a valve stem and collar; the stem adapted to rectilinear but limited movement within said collar including a terminal flange extending into said valve chamber; a stop ring disposed about said valve stem and in spaced relation thereto below the level of said collar; a swivel bearing cup having a rim engaging abutting said terminal flange of said valve stem; and a resilient, compressible valve diaphragm mounted about said valve stem and swivel bearing cup within said chamber; the improvement that includes, among other novel features, a radial space provided between the upper portion of said neck of said valve stem and the inner diameter of said stop ring such that said space comprises up to about 160 percent of the thickness of said diaphragm neck.

14 Claims, 4 Drawing Figures

VALVE DIAPHRAGM

CROSS REFERENCE TO RELATED APPLICATION

This application is related to the copending application Ser. No. 292,595 of Richard G. Parkison filed on even date herewith and entitled "VALVE DIAPHRAGM".

TECHNICAL FIELD

This invention pertains to a valve assembly for faucets.

BACKGROUND ART

Valve assemblies for controlling fluid flow through a valve chamber positioned between an inlet and outlet conduit and adapted for inherent correction of any misalignment that may occur between the valve component and cooperating stationary valve seat disposed in the valve chamber, or to adjust for irregularities in the valve seat itself while avoiding erosion of the valve, have been known heretofore and a variety of valve assemblies have been proposed and used for this purpose with varying degrees of effectiveness. Valve assemblies such as the foregoing providing, additionally, that the valve when closed and in abutment with the valve seat will not further rotate despite continued rotation of the valve stem are also well known for the purpose of avoiding abrasion and erosion.

The usual difficulties with known swivel assemblies, however, including sealing effectiveness, multiplicity and complexity of parts, undue cost as a consequence, vulnerability to break-down, and the substitution of equivalent erosion about the nexus of valve and valve stem for that eliminated between the valve and valve seat. A material advance in the state of the art was attained by securing to the end of a metallic valve stem a rubber seat by means of a plurality of retainer rings and incorporating a steel insert on the interior of the rubber seat to effect a swivelling adjustment of the diaphragm to any misalignment. However, this cup-like swivel component requires frequent lubrication and is not secured to the valve stem so that rotation of the valve stem does not lift the diaphragm and swivel insert from the valve seat but simply permits fluid pressure to move the diaphragm and washer upwards when the valve stem is moved away from the valve seat. A friction ring is also provided, normally, about the valve stem to provide resistance to rotation of the stem and thus a smooth functioning of the assembly rather than a sudden violent response to an abrupt rotation of the faucet handle attached to the stem. This friction ring, an O-ring normally, forms a sliding seal, as well, between the valve stem and valve housing and is subject to significant erosion and destruction in rotation of the stem to effect a linear movement thereof in the valve housing.

To obviate or reduce certain of the difficulties attendant upon the foregoing structure, an articulated valve stem was developed that permitted omission of the steel swivel insert. The stem comprises a main stem, a ball joint and foot member to accommodate any valve seat irregularity; or the like. This assembly, while providing a more effective mechanism, secures these advantages at a significant increase in size, complexity, and cost, due to material and engineering expenses. In addition, both this and the prior valve assembly include a separate stem nut and lock nut components in the valve housing.

In the event, therefore, that a swivel assembly could be constructed that would reduce the complexity and multiplicity of parts; would provide for independent rotation of the valve stem when the valve is in sealing engagement with a cooperating valve seat to eliminate erosion at the interface of the valve washer and valve seat; and do so without substituting an eroding interaction between the valve and cooperating valve stem; and, in addition, would provide for control and removal of the washer from the valve seat by direct operation of the valve stem away from the valve seat and without a dependence on the often unpredictable impact and rate of fluid flow from an inlet conduit; and would incorporate a sealing ring between the valve housing and stem that would avoid the destructive forces of slideable engagement of the sealing ring therebetween; a significant step forward in the state of the art would be secured.

DISCLOSURE OF THE INVENTION

This invention provides, accordingly, means for controlling the flow of fluid through a conduit system including a valve housing defining a valve chamber positioned between inlet and outlet conduits, by means of a valve assembly composed of a valve stem, swivel bearing and valve diaphragm mounted in cooperation with a valve seat within the valve housing. The valve stem is rotatably mounted in the housing to enable the stem to be moved axially towards and away from the valve seat. The head of the stem is adapted for retention in, and rotation by, a handle and the opposite end or foot of the valve stem is expanded axially and is continuous with a constricted annular neck which is expanded at its opposite end remote from said foot and about the intermediate portion of said stem to provide an annular flange for limiting axial movement of the valve stem within the valve assembly. Intermediate between said flange and the foregoing head, the valve stem is externally threaded for engagement and rotation in the faucet valve housing and to and away from a valve seat as aforesaid.

Mounted about the foregoing foot of the valve stem is a cup-shaped swivel component or washer formed of a hard but resilient plastic, the latter of inherent lubricity in a significantly preferred embodiment. This latter swivel element is adapted to receive the enveloping terminal portion of an axially flexible and resilient valve diaphragm.

The diaphragm is formed of a compressible elastomeric composition. The end closure or end cap portion of the diaphragm enveloping the stem foot and swivel component is adapted to seat in fluid sealing engagement in the valve seat when the valve stem is moved to a closed position. The diaphragm is expanded at its opposite end to provide a sealing ring secured to the valve housing.

Connecting, and integral with, the foregoing end cap and sealing ring portions of the diaphragm is a constricted neck portion which fits loosely about the annular neck of the valve stem sloping outwardly at its opposite ends to form the end cap and sealing ring. The diaphragm neck is axially resilient, flexible and compressible and the inner diameter of the diaphragm sealing ring is such that when the valve stem bearing the swivel component and diaphragm cap about its foot are moved to a valve open position the annular diaphragm neck collapses and is drawn up into the sealing ring and the end cap is positively lifted from the valve seat, without breaking the mechanical seal effected by the sealing ring with the surrounding valve housing and a stop ring of rigid construction, normally a metal or engineering plastic, positioned about the valve stem and retained in a fixed position within the valve assembly. The stop ring has an inner diameter less than that of the flange formed about the inner length of the valve stem to limit the axial movement of the valve stem and to prevent it from exerting undue compressive force on the diaphragm and its end cap into, and when in, contact with the valve seat; that is, a squeeze effect not in excess of about 45 percent of the thickness of said end closure means when it is compressed.

The valve diaphragm and swivel bearing adapt to, and compensate for, the presence of any irregularity in the surface of the seat or valve and provide for independent rotation of the valve stem with concomitant stationary disposition of the valve in the valve seat when the two are in contact in the closed position of the valve assembly.

The foregoing assembly provides for simplicity and relative miniaturization in construction with consequent conservation of materials and significant economic advantages; a reduction in the number of parts required, with elimination of a multiplicity of sites for erosion and leakage and the need for careful calibration in manufacture of the components to reduce the liklihood of leakage which tends to occur where a plurality of elements are required to mate with one another.

The diameter of the valve stem neck, which is cylindrical in conformation, is within a range of from about 65 percent to 85 percent of the interior diameter of the radially recessed neck of the diaphragm in the uncompressed and unextended state, in a significantly preferred embodiment of the invention.

Furthermore, the radial space defined by the upper portion of the necked stem and the inside diameter of the stop ring should be no greater that 160 percent of the wall thickness of the diaphragm neck and particularly the intermediate portion of the neck wall that is involuted or convoluted when the diaphragm is in a contracted state.

The foregoing and other objects and advantages will be evident from the description appearing hereinafter in context with the appended drawings.

BEST MODE FOR CARRYING OUT THE INVENTION

Figure 1:
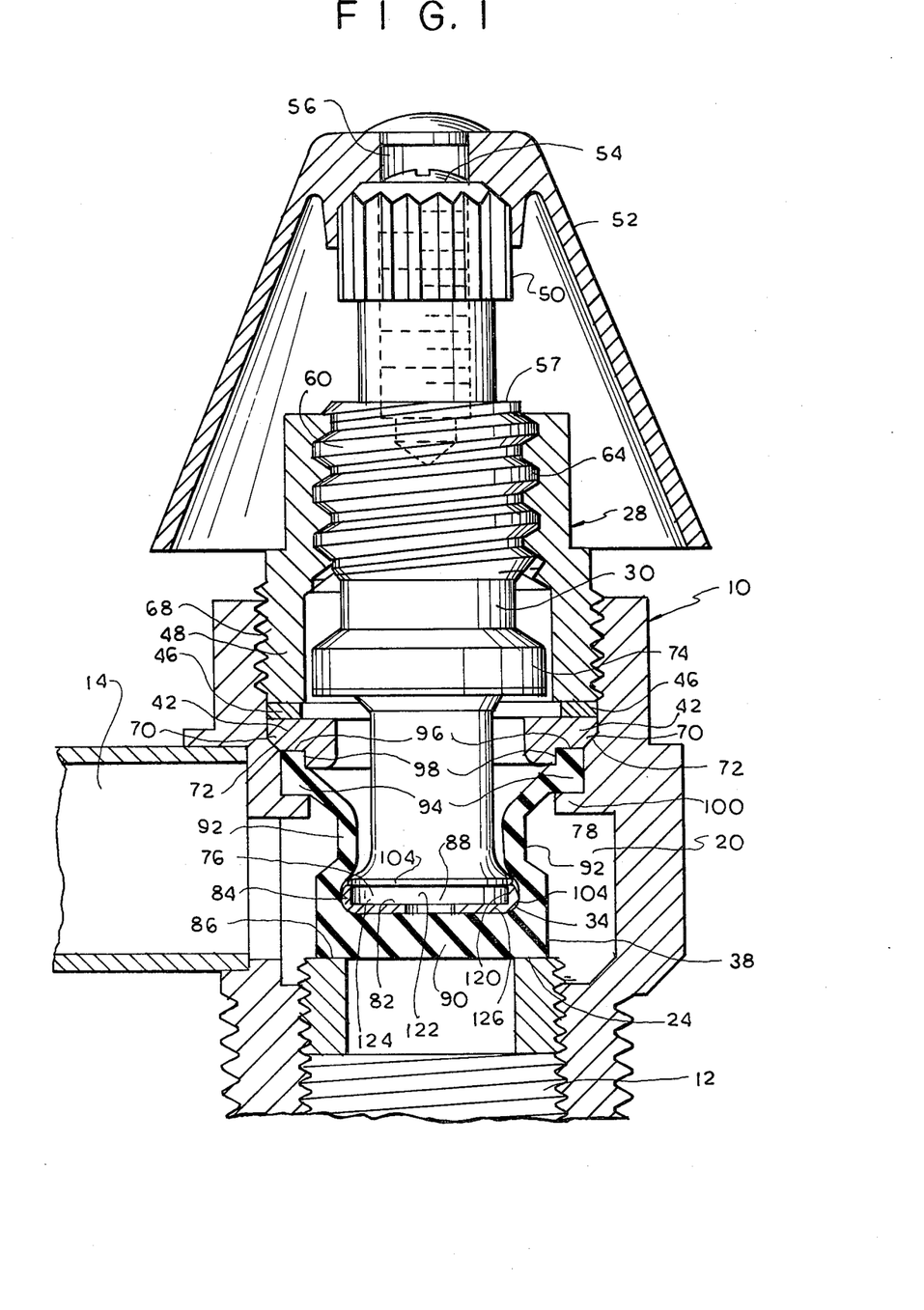
FIG. 1 is a longitudinal sectional view of a valve stem and valve diaphragm and sealing unit mounted in a faucet assembly including a valve chamber and fluid inlet and outlet conduits.

Referring to the drawings, and with particular reference to FIG. 1, a valve housing 10 is provided with an inlet conduit 12 and an outlet conduit 14, connected through a valve chamber 20, an annular valve seat 24 threadedly mounted in the valve housing 10 and adapted to operate in cooperation with the valve assembly 28 to control the flow of a fluid, notably a liquid, and particularly water, through the valve chamber 20 from the inlet 12 to and through the outlet 14.

The dry stem valve assembly 28 of the invention is composed of a valve stem 30, and a swivel bearing or washer 34, a valve diaphragm 38, a metallic stop or retaining ring 42, metallic friction washer 46 and a unitary stem nut or collar 48. The term "dry stem valve assembly" as employed herein is intended to refer to the isolation of the stem valve from the fluid passing through the valve chamber. The valve stem is, however, lubricated as described elsewhere herein. Indeed, the isolation of the stem from the fluid of the valve chamber in accordance with the invention permits retention for an indefinite term of the lubricant fluid in the stem valve assembly. The head 50 of the valve stem 30 is splined, or otherwise modified in a manner known to those skilled in the art for attachment to a faucet handle 52 to provide for rotation of the valve stem 30 in the manner prescribed herein. The faucet handle 52 is otherwise secured to the stem head 50 by a screw 54 received in the threaded interior of the recess 56 axially disposed in the stem head 50 and terminating in the intermediate body 58 of the valve stem 30. The annular exterior 60 of the body 58 occurring in spaced relation to the head 50 is threaded.

The intermediate exterior surface 60 of the valve stem 30 is adapted to threadedly and reciprocably engage the interior upper portion 64 of the stem nut or collar 48. The stem nut is also threaded about its outer lower exterior surface 68 for engagement with the valve housing 10. The stem nut or collar 48 is seated on the friction ring or washer 46 which is, in turn, contiguous with the stop ring 42. The stop ring has a sloped outer margin 70, knurled or otherwise serrated, for frictional engagement and seating in the shoulder 72 of the valve housing 10 as shown in FIG. 1.

The threaded portion 60 of the valve stem 30 also occurs in spaced relation to the radially disposed annular flange 74 along the intermediate axis of the stem body. This first or intermediate flange 74 is connected to an annular expanded foot or second or terminal flange 76 including a step 104 by a constricted neck 78, of cylindrical conformation, and substantially uniform diameter, in a particularly preferred embodiment.

Figure 2:
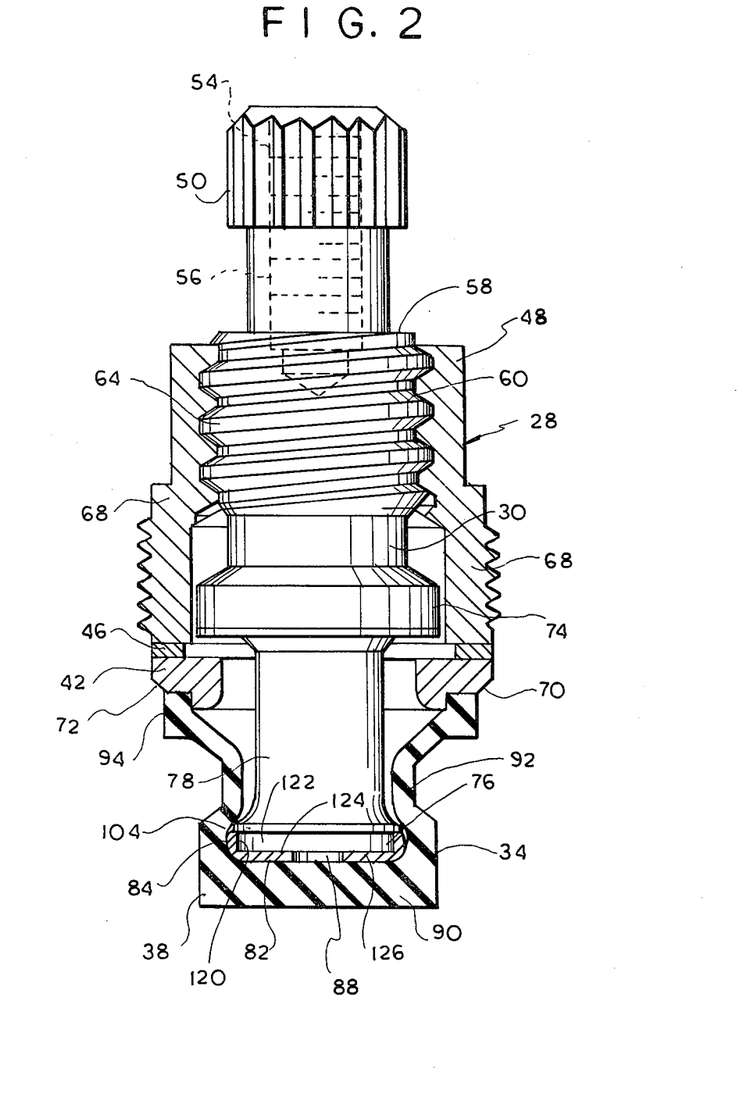
FIG. 2 is an enlarged longitudinal sectional view of the valve assembly shown in FIG. 1.
Figure 3:
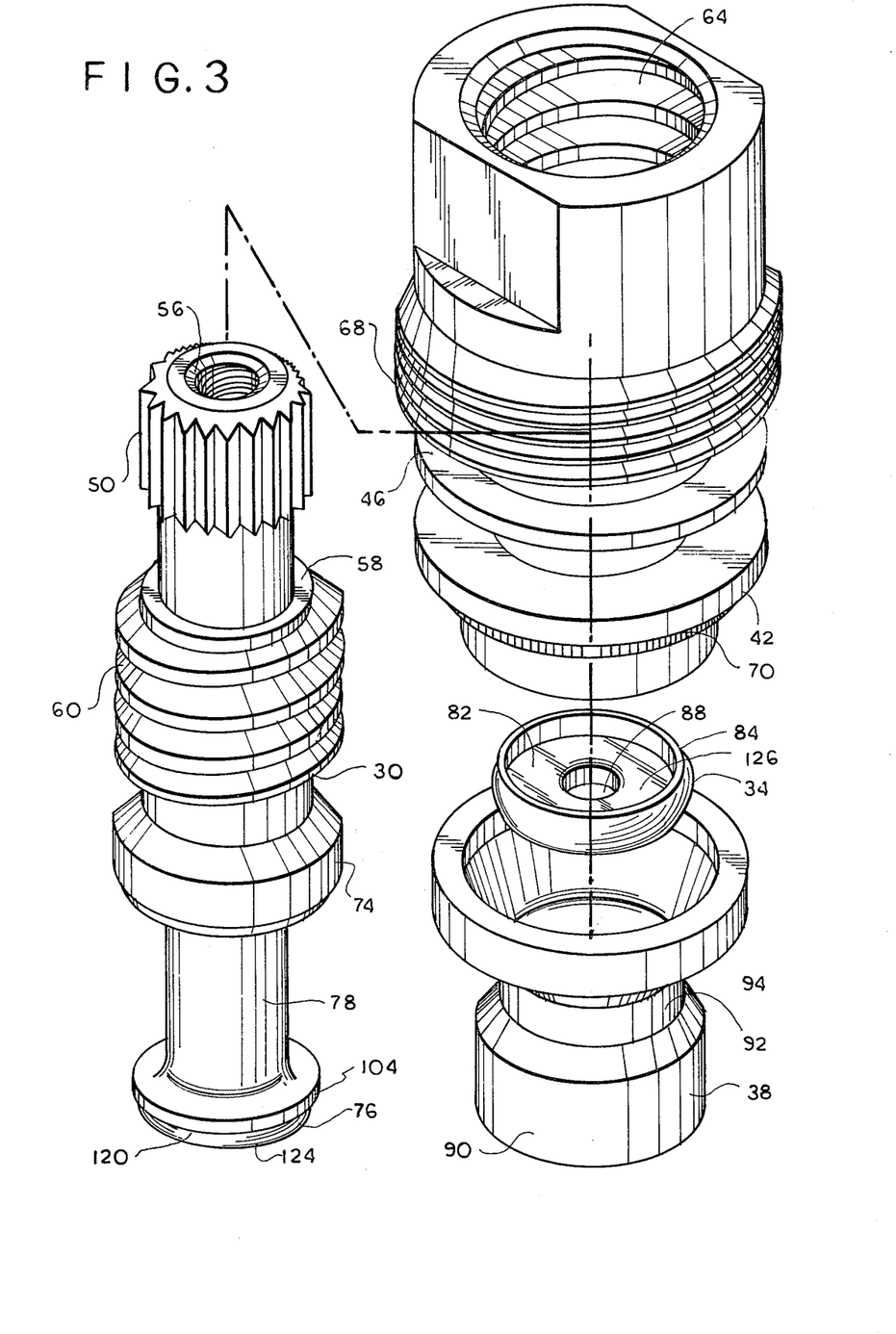
FIG. 3 is a partially exploded elevational view of the valve assembly of the present invention shown in FIGS. 1 and 2.

Mounted in contiguous engagement about the terminal flange or foot 76 is a cup-shaped disc or bearing, the swivel 34, comprising, in the preferred embodiment of the invention shown in FIGS. 1 to 3 of the drawings, a bearing surface 82, in contiguous relationship with the flattened radially extended surface of the foot 76 and terminating peripherally in the circumferentially disposed upwardly turned rim or lip 84. The lip or rim 84 provides the swivel with the capacity to be retained concentrically on the valve stem 30 and irregularities in the engaging rim 86 of the valve seat 24 are absorbed in the valve seating component 90 of the diaphragm 38.

Figure 4:
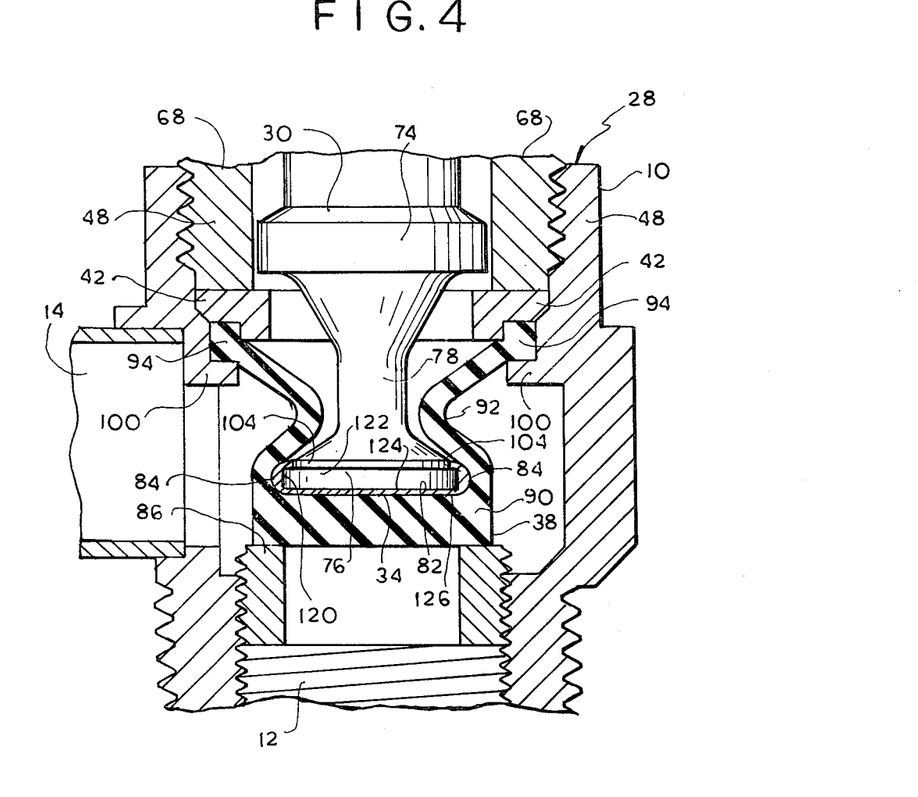
FIG. 4 is a fragmentary sectional view of a modified embodiment of the diaphragm and valve stem of FIGS. 1, 2 and 3 mounted in the faucet assembly of FIG. 1.

In the alternative, less preferred embodiment of FIG. 4, the swivel rim 84, in addition to extending upwardly at a right angle to the swivel bearing surface 82, as in the preferred embodiment of FIGS. 1 to 3, wraps around in snap-on engagement with the periphery or side wall 120 of the terminal flange which is curved in this alternative embodiment. This embodiment thus requires that the rim 84 be resilient in order to snap over the terminal flange 76 so that the swivel or cup 34 is caused to move axially with the stem and yet the swivel 34 is free to rotate on the stem or the stem within the swivel without binding between the stem and swivel.

Optionally, but preferred, as shown in the drawings, is a swivel 34 in the bearing surface 82 of which is defined a radially disposed orifice 88 or recess (not shown). The recess is of equivalent annular conformation and diameter and provides a spaced interval between the bearing surface and the terminal flange 76. The orifice or recess serves as a lubricant reservoir. In the former case, however, the diaphragm 38 must be retained in contiguous relation to the bearing surface 82 of the swivel 34 for the orifice to be functional for this purpose. In any event, the presence of the orifice 88 or a recess serves to reduce the minimal friction existing between the inner bearing surface 82 and lip or rim 84 of the swivel 34 and the terminal flange or stem foot 76 which are, as described elsewhere herin, in abutting relation. The lip or rim 84 is adapted to abut a step 104 forming a groove 105 disposed about the periphery of the foot or terminal flange 76, in a particularly preferred embodiment.

The step 104 and top margin of the rim 84 of the swivel integrate to form a smooth, essentially continuous mating of external surfaces, to avoid abrasion of the interior of the diaphragm at the point of its contraction from the end cap 90 into the neck portion 92 thereof. This is particularly significant in the valve stem configuration of FIGS. 1 to 3 where the step 104 represents the outer peripheral limit of the terminal flange 76; whereas in the embodiment of FIG. 4 the step 104 is recessed to accommodate the wrap-around rim 84 of the swivel 34.

In the preferred embodiment or mode of the invention, the step 104 is thus constructed as an overhanging component of the stem foot which meets the ascending rim or lip 84 of the swivel 34 as shown in FIGS. 1 to 3. The foregoing lip 84 is disposed in contiguous relation to the straight or substantially straight, vertical side wall 120 of the terminal tip 122 of the flange 76; and the ascending rim 84 of the swivel is, like the adjacent side wall 120 of the stem foot 76, at right, or substantially right, angles to the terminal stem foot surface 124 and swivel bearing surface 126 and inner bearing surface 82 of the swivel 34. The swivel 34 of the preferred embodiment is caused to adhere to the terminal flange 76 by the enveloping diaphragm 38. This bias is enhanced normally by the pressure exerted on the diaphragm by the transmitted fluid through the valve chamber when the assembly is in the valve open position. In the closed position, pressure is also exerted on the diaphragm, and consequently, the swivel, by contact of the diaphragm with the valve seat. The side wall 120 of the terminal extremity or tip 122 of the stem foot 76 is curved as shown in FIG. 4, as noted elsewhere herein to receive the wrap-around snap-on rim 84 which, in this embodiment, constitutes a gripping means.

The provision of an orifice 88 or, more particularly, a recess, in the swivel 34 is further preferred in that this orifice 88 provides clearance for a cut-off teat that is often present on the outer center portion of the stem foot as a result of processing of the valve stem 30 on a screw machine. Where the orifice is not included, and the cut-off teat occurs, the latter must be removed from the axis or center of the foot exterior by a separate operation, well-known to those skilled in the art.

The valve stem 30 is normally metallic and formed of brass, or less desirably, of aluminum or steel. The swivel 34 is formed of a plastic, and more particularly, a thermoplastic resin formulation, and most desirably, one incorporating an acetal copolymer, (including additionally, or in the alternative, a terpolymer) although a thermoplastic polyamide (nylon) may also be employed. The polyacetal resin formulation employed herein as an inherent lubricity that manifests itself in a dynamic coefficient of friction where the plastic is in contact with steel, brass or aluminum within the range of about 0.10 to about 0.35 and preferably about 0.15 as determined by ASTM Test Method D-1894. The preferred acetal copolymer resins for use herein, including terpolymers, also manifest a Rockwell hardness M-scale of about 30 to 85 as measured by ASTM D 785; a flexural strength at 5 percent deformation, using ASTM D 790, of about 10,000 psi to 15,000 psi, and preferably about 13,000 psi; an elongation at −40° F. of 15 percent of 30 percent, and preferably about 20 percent; and, at an ambient temperature of 73° F., of 45 percent to 75 percent and most desirably about 60 percent, employing ASTM D 638 Speed B. The preferred acetal resins for use herein are those having a melt index of from about 7 to about 27.

Polyacetal resins for use in the practice of the present invention are sold under the trademark CELCON by Celanese Corporation, and most desirably CELCON M 90-04, and under the trademark DELRIN by the duPont Company of Wilmington Delaware. The coefficient of friction of the plastic employed can be even further and significantly reduced by use of an appropriate lubricant such as a conventional silicone concentrate or other standard lubricant oil well known to those skilled in the art to which this invention pertains, and may, as indicated hereinabove, be retained in the reservoir 88.

The swivel 34, as thus described, permits free rotation of the valve stem 30 with respect to the swivel unit 34. This latter unit 34 will remain stationary with respect to any rotary movement of the valve stem 30 and terminal flange 76 when the diaphragm 38, secured to the swivel unit 34, and in turn to the valve housing, as described in detail hereinafter, is seated in the valve seat 24. The diaphragm, in cooperation with the swivel 34, will remain stationary as well, eliminating the significant erosion that would otherwise occur between the valve diaphragm 38 and valve seat 24 with continued rotation of the valve stem 30 when it is moved in conventional manner to close the valve and eliminate fluid flow through the valve chamber 20. Other aspects and advantages of the relationship, construction and composition of the swivel component 34 and valve diaphragm 38 will be evident from the discussion occurring hereinafter.

Disposed about the exterior of the swivel 34, therefore, is the valve diaphragm 38 formed of a resilient, compressible elastomer, such as synthetic or natural rubber, polychloroprene, styrene-butadiene copolymer (GRS,Buna N), polybutadiene, or the like. The diaphragm 38 comprises a flattened terminal or seating component or end cap 90 for engaging the rim 86 of the valve seat 24 when the valve assembly is in a closed position. The interior surface of the diaphragm end cap or valve 90 abuts the entire, or substantially all, of the outer surface of the swivel 34 and provides a closed end to the bearing orifice 88, where present, and continues in an abutting engagement about the bearing rim 84; so that the terminal end cap seating means 90 is retained in and about the swivel rim 84 as the stem 30 and the integral lower or terminal flange or foot 76 contained in the swivel 34 is moved towards or away from the valve seat.

The diaphragm contracts radially from its end cap seating means 90 into a resilient, axially expandable and contractible radially recessed neck 92 that is disposed about and in spaced relation to the corresponding neck 78 of the valve stem 30.

The valve stem neck 78 and the neck 92 of the diaphragm 38 are disposed in spaced parallel alignment along the intermediate portion of the diaphragm neck 92. The valve stem neck 78 has a diameter within the range of about, or precisely, 65 percent to 85 percent, whether in the embodiment FIGS. 1 to 3 or that of FIG. 4 of the drawing, and preferably, about or precisely, 75 percent, of that of the inside diameter of the diaphragm neck 92 along this intermediate, most radially contracted portion of the diaphragm 38, as determined when the diaphragm is in an unstressed, unextended and uncompressed state.

Further, the radial space defined by the upper portion of the neck 78 of the valve stem 30 and the inside diameter of the stop ring 42 is, in context with the foregoing diameter relationship, up to, and not in excess of about 160 percent of the wall thickness of the diaphragm neck 92, and particularly the intermediate portion of the diaphragm neck wall that is involuted or convoluted when the diaphragm 90 is in a contracted state.

This relationship of the stem, diaphragm neck and stop ring prevents the undue involution or collapse of the wall of the diaphragm neck 92 when the diaphragm end cap 90 is withdrawn from the valve seat 24. This limitation on the flexure of the diaphragm neck has been found to prevent fracture thereof over an extended period of time when the neck is flexed in response to the pressure occurring in the valve chamber when fluid is passing therethrough. The foregoing diameter relationship also permits sufficient flexing of the diaphragm neck to permit a collapsing thereof most efficient to removal of the diaphragm end cap 90 from the valve seat 24 when desired.

The range in size of the internal diameter of the diaphragm extends from about 0.275 inch to about 0.375 inch; and is more desirably from 0.312 inch to 0.337 inch; preferably from 0.300 inch to 0.350 inch; and, in a particularly preferred embodiment is about 0.325 inch. These parameters have application, by way of illustration, to standard water faucet assemblies and the like; and are particularly useful, for example, in those assemblies which are capable of transmitting approximately 2.5 gallons per minute to 4 gallons per minute.

The alternative and less preferred embodiment of the diaphragm 90 shown in FIG. 4 wherein the neck 92 of the diaphragm 38, while maintaining a spaced relation to the neck 78 of the valve stem 30, is sloped inwardly toward the axis of the stem at a point intermediate between the sealing ring 94 and the end cap, end closure means of valve 90. The diaphragm 38 may, alternately and preferably, assume an intermediate parallel alignment similar to that shown in FIGS. 1 to 3, as well, and insofar as its radial extension provides a diameter and spatial relationships with respect to the valve stem neck 78 and stop ring 42, such as described hereinabove, and one that is sustained along the length of the diaphragm neck and that of the stem valve, a desirable valve assembly is attained. The V-shape in vertical section of the diaphragm neck as seen in FIG. 4, rather than the substantially uniform diameter of the stem neck 78 together with a corresponding uniformity in the axial inner diameter of the intermediate portion of the diaphragm neck, is, however, less preferred.

As will be evident, however, from the embodiment of FIG. 4, in which the cross-sectional diameter of the stem neck is uniform briefly intermediate between its opposite ends but expands axially in a sloped gradual manner to form the intermediate and terminal flanges 74 and 76 respectively, the stem neck may assume a variety of cross-sectional forms, so long as the diameter relationships critical to a significantly superior valve assembly are maintained. In this context, the employment of polygonal configurations in construction of the stem neck is, for example, avoided so that any tendency toward abrasion of the interior wall of the elastomeric diaphragm neck will be avoided.

The embodiments of FIGS. 1 to 3 illustrates the foregoing preferred embodiment in which the neck 92 of the diaphragm 38, intermediate between its radial expansion at either end and the neck 78 of the valve stem 30 assume a cylindrical construction of uniform or substantially uniform diameter.

The diaphragm neck 92 expands thereafter, in any event, as noted, in its upward extension in a sloped or conical manner terminating in the radially expanded diaphragm sealing ring or flange 94. The inner margin of the diaphragm sealing rim ring 94, at its nexus with the outwardly sloping neck 92 has, in a preferred embodiment, a diameter larger than the outer diameter of the terminal seating component or diaphragm end cap. The sealing ring 94 and end cap 90 are thicker and, as a consequence, more rigid than the diaphragm neck 92. The flexibility of the latter is essential to the bellows-like action to which it is subjected in opening and closure of the diaphragm valve 90 with simultaneous retention in place of the sealing ring 94.

To elaborate on the relationship and function of the diaphragm, in the rotary movement of the valve stem 30 in the stem nut 48 away from the valve seat 24, to an open position, the end cap (90) portion of the diaphragm 38 does not rotate but moves in a linear or axial direction with the plastic swivel 34 about which it is retained. The terminal flange rotates with the remainder of the valve stem 30 of which it is an integral part. Protection against rotation, erosion and distortion of the diaphragm 38 is afforded by the swivel 34 which does not rotate. The axially constricted and sloped tubular diaphragm neck 92 is drawn up into the passage defined by the lower and inner margin of the stop ring 42, upon which the diaphragm sealing ring or rim 94 is mounted, and the necked portion 78 of the valve stem, when the valve stem 30 is moved away from the valve seat 24 to an open position.

The diaphragm sealing ring 94 engages and seats upon the metallic stop ring 42 within the sloped knurled border 70 thereof as shown in FIG. 3 and upon the radially flat surface 96 thereof as seen particularly in FIG. 1 and within the downwardly disposed annular inner shoulder or flange 98 adapted to engage the inner margin of the diaphragm sealing ring 94 and prevent its deformation inwardly with consequent breaking of the seal it provides. A metallic friction washer is positioned between the lower terminus of the stem nut 48 and the upper surface of the foregoing stop ring 42.

The outer periphery of the elastomeric sealing ring 94 impinges against the inner wall of the valve housing 10 and is supported in that position by the inwardly directed shoulder 100 of the valve housing 10. The sealing ring 94 thus nests in the groove provided by the stop ring 42 atop the sealing ring 94 and, as noted, on its own interior margin, by means of the stop ring's downwardly disposed flange 98, as well. As a result, with tightening of the stem nut 48 in the valve housing 10, the resilient, compressible, sealing ring 94 secures the nexus of the stop ring 42 and valve housing 10 against leakage of fluid passing through the valve chamber 20. At the same time, the sealing ring 94 prevents rotation of the diaphgram 38 in the valve assembly 28.

The friction washer 46 permits tightening of the stem nut or collar 48 into the assembly with movement thereof relative to the smooth upper surface of the stop ring 42 without causing the latter to move and abrade the surface of the sealing ring 94 of the diphragm 38.

As will be evident from the discussion appearing herein, all of the components of the valve assembly of the invention, with the exception of the elastomeric diaphragm 38 and the swivel 34, are made of hard, rigid material such as, for example and normally, a metal such as brass, aluminum, steel, nickel, copper or other alloys, engineering plastic or the like, known to those skilled in the art.

The diaphragm sealing ring or rim 94 of the diaphragm 38 in engagement with the stop ring 42 and valve housing 10 thus provides, as noted, the valve assembly 28 with a fluid seal which, in that the diaphragm 38 is retained in a stationary position by virtue of the swivel bearing element 34, is protected against the erosion that would be experienced by a conventional O-ring seal, for example, present about the valve stem. The O-ring, as conventionally disposed, is subject to wear in its slideable engagement with the inner surface of the valve housing in linear and rotational movement of the valve stem through the housing between open and closed positions.

The first or intermediate flange 74 of the valve stem 30 serves to define the maximum distance the end cap or valve portion 90 of the diaphragm 38 may be moved, to or away from the rim 86 of the valve seat 24.

To effect this purpose of outer diameter (or at least a portion thereof) of the intermediate flange 74 is made to exceed that of the inner diameter of the threaded upper inner wall 64 of the stem nut or collar 48, so that the latter threaded surface 64 acts as a stop against removal of the valve stem 30 from the valve housing 10 and, specifically, the stem nut 48. This relationship and construction is particularly significant in that when the valve stem 30 is withdrawn, with concomitant linear movement of the diaphragm end cap 90 and involuted contraction of the tubular diaphragm neck 92 into the passage defined by the diaphragm sealing rim or ring 94, the rotational outward movement of the stem will not exceed that which would distort and disrupt the sealing rim 94 of the diaphragm, unduly distend the diaphragm neck 92, or upset the assembly of diaphragm 38, friction washer 46, and stop ring 42 as aforesaid.

The radial expansion or diameter of the first or intermediate flange 74 also exceeds that of the inner margin of the stop ring 42 so that the valve stem 30 cannot extend in its axial movement beyond a prescribed limit providing for firm, secure engagement of the end cap 90 with the rigid, hard valve seat 24 but without undue stress or compression being exercised on the end cap 90, the valve seat 24, or the other relevant components such as, illustratively, the swivel 34, terminal flange 76 or the diaphragm neck 92 thereof.

The downward movement of the stem is thus limited to that which provides a squeeze or compression of within the range, approximately and preferably precisely, of from 25 percent to 45 percent, and most desirably about 35 percent, of the diaphragm end cap 90 between the valve seat 24 and swivel 34.

As will be evident from the foregoing description and that appearing hereinafter the physical properties of the elastomer forming the diaphragm 38 are also of material relevance in securing many of the significant advantages residing in the practice of the present invention.

The elastomer for use in accordance with the invention has, accordingly, a durometer hardness of from about 65 to 75, and preferably about 70, as measured by a durometer gauge according to ASTM D 2240-68 and read on a Type A scale; and a minimum tensile strength, as determined by ASTM D 412, of 700 psi min. to 2000 psi, min. More desirably, minimum tensile strength will not be less than 1000 psi, and more desirably 1500 psi. The elastomer has, in addition, a maximum compression set resistance according to ASTM D 395 Method B of up to and not in excess of about 15 percent.

The resilience, compression and frictional properties of the diaphragm are significant as well in that they are necessary to realization of significant advantages of the invention.

It is essential, by way of illustration, that the frictional engagement between the inner surface of the diaphragm end cap or valve 90 and the outer surface of the swivel 34 be sufficient to retain the swivel in a static or stationary position, that is, in a non-rotational state (without reference to its linear or axial movement) when the valve stem 30 bearing the swivel 34 and diaphragm end cap 90 is rotated to or away from the valve seat 24. The plastic swivel 34 exerts minimal friction, a property necessary to its satisfactory engagement with the valve stem 30, so that the latter can rotate independently and free of erosion induced by the failure to rotate, of the swivel 34. A positive resistance to rotation of the diaphragm end cap 90 and indeed the entire diaphragm 38, and communicated by it to the plastic washer or swivel 34, is that effected by the second primary function of the diaphragm sealing ring 94 in that its positive engagement with the metallic stop ring 42, valve housing 10, and valve housing shoulder 100 prohibits such rotary movement.

The compressible, resilient character of the end cap 90 is, of course, also essential to an effective fluid seal.

Elaborating upon, in part, and reviewing, the objectives and advantages of the present invention, it will be evident, therefore, that in contrast to conventional compression valve assemblies wherein the rubber washer is abraded by its frictional rotary shearing motion in being removed from or brought into contact with the valve seat, the end cap 90 of the invention is moved only in an axial path, the valve stem 30 alone assuming a rotary, as well as an axial, movement within the valve housing 10.

Further, the presence of the first or intermediate flange 74 made of metal, preferably, or an engineering plastic or the like, along the intermediate axis of the stem body 30, in combination with the interior shoulder provided by the stem nut 48 at the upper end and the stop ring 42 both made of metal or material of similar wear-resistant properties, limits the axial movement of the valve stem 30 and, as a consequence, precludes excessive compressive stress from being exerted by the user of the faucet in which the valve assembly is contained, on the elastomeric diaphragm 38, and particularly on its end cap 90, in closing of the valve; preventing undue distortion, stress, dislocation, and rupture of the diaphragm 38, and particularly its neck portion 92, when the valve is open. Indeed, since a user cannot know when he is inducing excessive torque, stresses of this kind are believed to occur frequently in the use of conventional compression valve assemblies known heretofore.

The provision of this limiting, in effect, "metal to metal" axial reciprocal movement of the stem 30, free of rotation of the diaphragm 38, not only eliminates abrasion and distortion otherwise likely to occur, but since the diaphragm will continue to seat properly and effectively in the closed position over an extended period of time without faucet dripping or the like, attempts to use excessive force by a user of the faucet incorporating the valve assembly of the invention are less likely to occur.

The diaphragm 90, by virtue of its sealing ring 94 engaged between the stop ring 42 and valve housing 10, as described hereinafter, and the enclosure of the valve stem neck 78 and stem foot 76 by the diaphragm 90 also serves to isolate the valve stem 30 and swivel 34 from contact with the fluid, normally water or other liquid, passing through the valve chamber (20) passageway.

As a result of this sealed construction, the grease, or other lubricant or the like applied to the valve assembly at the time of manufacture, or thereafter introduced into the radially disposed lubricant reservoir 88 or recess, will be retained in the assembly to inhibit erosion and maintenance of a smoothly operating valve assembly.

In compression valves known heretofore, on the other hand, the threads of the valve stem have conventionally been submerged in the water passageway or valve chamber and the lubricant is readily removed by the passing fluid; an undesirable effect where, for example, the valve assembly is used to monitor the supply of drinking water.

The present invention further obviates, as noted elsewhere herein, the use of the conventional packing gland or O-ring to seal the exposed stem and prevent leakage about the faucet handle. The packing gland is normally insufficiently resilient and leaks with age and use, in any event, and the elastomeric O-ring while resilient is, nevertheless, also adapted to rotate with the stem with consequent abrasion and leakage. The sealing ring 94 of the diaphragm 38 replaces the foregoing packing gland and O-ring providing a static seal immune from the stresses of rotary movement of the stem. The diaphragm thus enjoys a multiple of functions, including those of a stem sealant, lubricant retention means and valve closure member.

In any event, as described herein, a particularly significant relationship and construction in the valve assembly of the invention for the purpose of securing a valve structure that meets the most arduous testing standards employed for assessing the reliability of faucets, and particularly those water faucets used in kitchens, bathrooms and the like; illustratively, capable of transmitting approximately 2.5 gallons per minute to 4 gallons per minute, and including cycle life tests in a hot water environment and portable washer tests, is that in which the diameter of the substantially uniform within the range of about, of precisely, 65 percent to 85 percent of the interior diameter of the intermediate portion of the diaphragm neck; and in which, further, the radial space defined by the upper portion of the necked stem and the inside diameter of the stop ring should be no greater than 160 percent of the wall thickness of the diaphragm neck which is also substantially uniform intermediate its opposing ends and particularly the intermediate portion of the neck wall that is involuted or convoluted when the diaphragm is in a contracted state.

A further provision of material significance in this context is the incorporation in the valve assembly of the overhanging step 104 mating with the vertically disposed rim 84 of the swivel 34.

It will be evident that the terms and expressions which have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. In a valve structure for controlling fluid flow comprising a valve assembly and a valve housing; said valve housing including a valve chamber incorporating fluid inlet and outlet conduits and a valve seat, and said valve assembly disposed within said housing and comprising a valve stem and stem collar; said valve stem movable engaged within said collar and extending beyond said collar at both ends and having a first intermediate radially expanded flange disposed about the intermediate portion of said valve stem and within said collar and a second radially expanded terminal flange spaced from said first flange and provided about the lower end of said valve stem and below the level of said collar; said intermediate and terminal flanges being connected by a constricted neck; an angular stop ring disposed about said valve stem and in spaced relation thereto below the level of said collar; a swivel bearing cup having a rim abutting said terminal flange of said valve stem; a resilient, compressible, annular valve diaphragm including a radially expanded end closure means, sealing ring and a constricted interconnecting neck, said end closure means being secured about said swivel bearing cup in spaced relation to that portion of said terminal flange encapsulated by said swivel bearing cup, said swivel bearing cup being disposed adjacent to said constricted neck of said valve diaphragm, and said closure means being adapted to seat on said valve seat to impede fluid flow through said valve chamber when said valve assembly is disposed in a closed position; said swivel bearing cup and valve diaphragm end closure means being adapted to move toward and away from said valve seat with corresponding axial movement of said valve stem; said valve stem being adapted to rotate independently of said swivel cup and said diaphragm in affecting said axial movement; said sealing ring being secured to said stop ring and mounted thereon in spaced relation about said valve stem; and said constricted interconnecting neck being adapted to axial expansion and contraction with movement of said stem, said swivel bearing cup and said diaphragm end closure means toward and away from said valve seat; the improvement that comprises a radial space provided between the upper portion of said neck of said valve stem and the inner diameter of said stop ring such that said space comprises up to about 160 percent of the thickness of said diaphragm neck to assist in preventing undue involution or collapse of said constricted neck of said valve diaphragm when said end closure means is withdrawn from said valve seat to prolong the life of said valve diaphragm.

2. A valve structure as claimed in claim 1 wherein said percentage of radial space is measured against the thickness of the intermediate portion of said diaphragm neck.

3. A valve structure as claimed in claim 1 wherein diaphragm neck and said stem neck have substantially uniform diameters along a portion of the intermediate lengths thereof.

4. A valve structure as claimed in claim 1 wherein said second flange includes an overhanging step adjacent the termination of said flange, remote from said stem neck.

5. A valve structure as claimed in claim 4 wherein said swivel bearing cup includes a straight, vertically disposed rim with respect to the remainder of said cup.

6. A valve structure as claimed in claim 1 wherein said second flange includes an overhanging step adjacent the termination of said flange and remote from said stem neck; said swivel bearing cup including a straight, vertically disposed rim with respect to the remainder of said cup; the outer periphery of said step and rim contacting the inner surface of said diaphragm; and said step and rim presenting a smooth complementary surface by contact with each other to define an essentially uniform and continuous outer surface at the point of contact thereof.

7. A faucet valve assembly as claimed in claim 1 wherein the diameter of said expanded intermediate flange of said valve stem exceeds that of the inner diameter of each of said threaded stem collar and stop ring for the purpose of defining the scope of axial movement of said valve stem.

8. A faucet valve assembly as claimed in claim 1 wherein the axial movement of said radially expanded intermediate flange of said valve stem is sufficient to effect a squeeze of said end closure means when moved axially into contact with said valve seat to within a range of about 25 percent to about 45 percent of the thickness of said end closure means when uncompressed.

9. A faucet valve assembly as claimed in claim 1 wherein said intermediate flange is capable of rectilinear movement sufficient to effect a squeeze of said end closure means of about 35 percent.

10. In a faucet valve assembly comprising a valve stem, a swivel bearing cup, a resilient compressible valve diaphragm, a stem collar and a stop ring; said valve stem being threadedly mounted in said stem collar and adapted for rotatable and rectilinear movement therein; said stop ring being disposed about said valve stem in spaced relation thereto below the level of said collar; said stem extending beyond the level of said collar at both ends; the lower end of said stem valve stem comprising a stem neck extending beyond the lower end of said collar and forming a radially expanded terminal flange; said swivel bearing cup comprising a flat bearing surface and a resilient peripheral rim abutting said flange and securing said cup thereto to provide free rotation of said stem therein independently of said cup; siad valve diaphragm having an end closure means, sealing ring and interconnecting constricted neck portion, said end closure means being radially expanded and mounted on said swivel bearing cup in spaced relation to that portion of said terminal flange encapsulated by said swivel bearing cup being disposed adjacent to said constricted neck of said valve diaphragm; said swivel bearing cup; said sealing ring being disposed about said stem and secured to said stop ring; and said interconnecting neck being axially expandable and contractible; whereby said swivel bearing cup and end closure means are adapted to move toward and away from said valve collar with corresponding rectilinear movement of said valve stem; the improvement that comprises a radial space provided between the upper portion of said neck of said valve stem and the inner diameter of said stop ring such that said space comprises up to about 160 percent of the thickness of said diaphragm neck to assist in preventing undue involution or collapse of said constricted neck of said valve diaphragm when said end closure means is withdrawn from said valve seat to prolong the life of said valve diaphragm.

11. A faucet valve assembly as claimed in claim 1 or claim 10 wherein said stem neck has a diameter within the range of from about 65 percent to about 85 percent of the interior diameter of the radially recessed neck of said diaphragm intermediate between the expanding opposite ends of said diaphragm.

12. A faucet valve assembly as claimed in claim 10 wherein said diameter of said stem neck is about 75 percent of the interior diameter of said radially recessed diaphragm neck.

13. A faucet valve assembly as claimed in claim 10 wherein an orifice or reservoir is provided in said swivel bearing cup and said swivel bearing cup is composed of a polyacetal resin or nylon.

14. A faucet valve assembly as claimed in claim 10 wherein each of said diaphragm neck and said stem neck has a substantially uniform diameter intermediate between its opposite ends.

* * * * *